US011967335B2

(12) United States Patent
Du et al.

(10) Patent No.: US 11,967,335 B2
(45) Date of Patent: Apr. 23, 2024

(54) FOVEATED BEAMFORMING FOR AUGMENTED REALITY DEVICES AND WEARABLES

(71) Applicant: Google LLC, Mountain View, CA (US)

(72) Inventors: Ruofei Du, San Francisco, CA (US); Hendrik Wagenaar, Santa Clara, CA (US); Alex Olwal, Santa Cruz, CA (US)

(73) Assignee: Google LLC, Mountain View, CA (US)

( * ) Notice: Subject to any disclaimer, the term of this patent is extended or adjusted under 35 U.S.C. 154(b) by 420 days.

(21) Appl. No.: 17/446,877

(22) Filed: Sep. 3, 2021

(65) Prior Publication Data

US 2023/0071778 A1 Mar. 9, 2023

(51) Int. Cl.
*G06F 3/01* (2006.01)
*G06T 7/50* (2017.01)
*G06T 7/70* (2017.01)
*G06V 40/16* (2022.01)
*G06V 40/19* (2022.01)
(Continued)

(52) U.S. Cl.
CPC ............. *G10L 21/10* (2013.01); *G06F 3/013* (2013.01); *G06T 7/50* (2017.01); *G06T 7/70* (2017.01); *G06V 40/171* (2022.01); *G06V 40/19* (2022.01); *G10L 15/22* (2013.01); *G10L 15/25* (2013.01); *G10L 15/26* (2013.01); *G10L 21/18* (2013.01); *H04R 1/08* (2013.01); *H04R 1/406* (2013.01); *H04R 3/005* (2013.01); *G06T 2207/30201* (2013.01); *H04R 2201/401* (2013.01)

(58) Field of Classification Search
CPC .................................. G06F 3/013; H04S 7/303
See application file for complete search history.

(56) References Cited

U.S. PATENT DOCUMENTS 9,076,450 B1 * 7/2015 Sadek .................... H04R 1/406
10,440,496 B2 * 10/2019 De Bruijn ................ H04R 3/12
(Continued)

FOREIGN PATENT DOCUMENTS

CN 114546102 A * 5/2022

OTHER PUBLICATIONS

Casiez, et al., "1€ Filter: A Simple Speed-based Low-pass Filter for Noisy Input in Interactive Systems", CHI'12, 30th Conference on Human Factors in Computing Systems, May 5-10, 2012, pp. 2527-2530.
(Continued)

*Primary Examiner* — Feng-Tzer Tzeng
(74) *Attorney, Agent, or Firm* — Brake Hughes Bellermann LLP

(57) ABSTRACT

An augmented reality (AR) device, such as AR glasses, may include a microphone array. The sensitivity of the microphone array can be directed to a target by beamforming, which includes combining the audio of each microphone of the array in a particular way based on a location of the target. The present disclosure describes systems and methods to determine the location of the target based on a gaze of a user and beamform the audio accordingly. This eye-tracked beamforming (i.e., foveated beamforming) can be used by AR applications to enhance sounds from a gaze direction and to suppress sounds from other directions. Additionally, the gaze information can be used to help visualize the results of an AR application, such as speech-to-text.

20 Claims, 8 Drawing Sheets

(51) Int. Cl.
*G10L 15/22* (2006.01)
*G10L 15/25* (2013.01)
*G10L 15/26* (2006.01)
*G10L 21/10* (2013.01)
*G10L 21/18* (2013.01)
*H04R 1/08* (2006.01)
*H04R 1/40* (2006.01)
*H04R 3/00* (2006.01)

(56) References Cited

U.S. PATENT DOCUMENTS

| | | | |
|---|---|---|---|
| 10,739,849 B2* | 8/2020 | Stafford | G06F 1/1694 |
| 2014/0292620 A1 | 10/2014 | Apstun | |
| 2015/0063603 A1* | 3/2015 | Henderek | G06T 7/74 |
| | | | 381/122 |
| 2016/0091967 A1 | 3/2016 | Prokofieva et al. | |
| 2017/0188173 A1* | 6/2017 | Ranieri | H04R 25/43 |
| 2017/0221500 A1* | 8/2017 | Glasgow | G02B 27/0093 |
| 2017/0277257 A1* | 9/2017 | Ota | G02B 27/017 |
| 2019/0394606 A1* | 12/2019 | Tammi | G10L 19/008 |
| 2022/0197380 A1* | 6/2022 | Tokubo | A63F 13/25 |

OTHER PUBLICATIONS

Kalman, "A new approach to linear filtering and prediction problems", Transactions of the ASME—Journal of Basic Engineering, 82 (Series D), 1960, 12 pages.

Kartynnik, et al., "Real-time Facial Surface Geometry from Monocular Video on Mobile GPUs", arXiv:1907.06724, Jul. 15, 2019, 4 pages.

Valentin, et al., "Depth from Motion for Smartphone AR", ACM Transactions on Graphics, vol. 37, No. 6, Article 193, Nov. 2018, pp. 1-19.

Van Veen, et al., "Beamforming: A Versatile Approach to Spatial Filtering", IEEE ASSP Magazine, Apr. 1988, 21 pages.

* cited by examiner

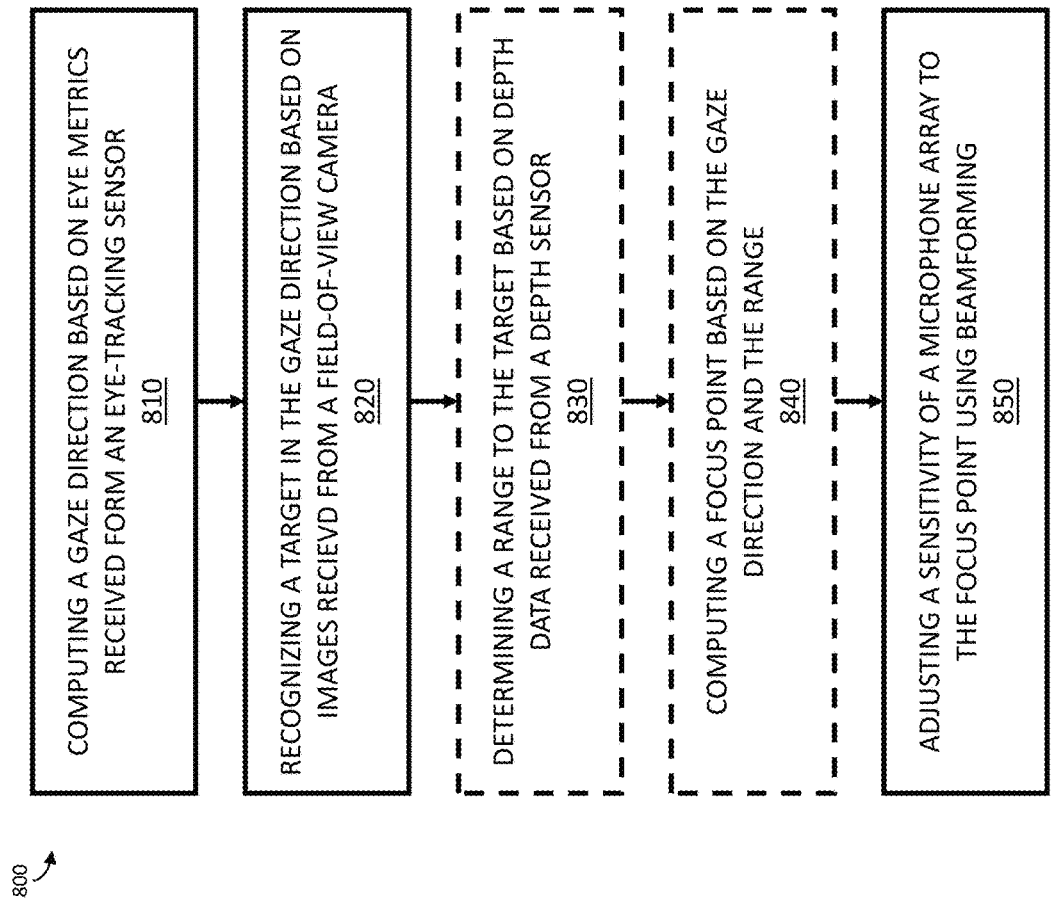

FOVEATED BEAMFORMING FOR AUGMENTED REALITY DEVICES AND WEARABLES

FIELD OF THE DISCLOSURE

The present disclosure relates to augmented reality and more specifically to a head-worn augmented reality device having foveated beamforming.

BACKGROUND

Signals from microphones can receive speech from all directions, making it challenging to distinguish speech from different sources. For example, speech received from all directions may result in speech-to-text transcriptions that are difficult to understand. Signals from the microphones can be processed to spatially filter sounds from a particular direction in a process known as beamforming. In other words, beamforming may enhance sounds from a particular direction while suppressing sounds in directions other than the particular direction.

SUMMARY

In at least one aspect, the present disclosure generally describes augmented reality glasses. The augmented reality glasses include a microphone array that is configured to capture a plurality of audio signals that include sounds from around a user. The augmented reality glasses further include an eye-tracking sensor that is configured to sense eye metrics of the user. The augmented reality glasses further includes a processor that can be configured by software to perform a method. The method includes applying a filter (e.g., low-pass filter) to the eye metrics from the eye-tracking sensor. The method further includes computing a focus point based on the filtered eye metrics and gaze data from other sensors of the augmented reality glasses. The method further includes combining the plurality of audio signals according to the focus point to generate a beamformed audio signal in which the sounds around the user are enhanced and suppressed according to their position relative to the focus point. The method further includes adjusting an output of an application based on the beamformed audio signal and a gaze direction towards the focus point.

In another aspect, the present disclosure generally describes a method for gaze-directed beamforming on AR glasses. The method includes computing a gaze direction based on eye metrics received from an eye-tracking sensor of the AR glasses. The method further includes recognizing a target in the gaze direction based on images received from a field-of-view camera of the AR glasses. The method further includes determining a range to the target based on depth data received from a depth sensor of the AR glasses. The method further includes computing a focus point based on the gaze direction and the range and adjusting a sensitivity of a microphone array of the AR glasses to the focus point using beamforming.

In another aspect, the present disclosure generally describes a method for transcribing speech-to-text. The method includes receiving eye metrics of a user wearing AR glasses from an eye-tracking sensor. The method further includes computing a gaze direction based on the eye metrics and adjusting a sensitivity of a microphone array of the AR glasses to the gaze direction using beamforming. The method further includes generating a transcript based on speech received by the microphone array and adjusting a visual feature of the transcript based on the gaze direction. The method further includes displaying the transcript on a display of the AR glasses.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

FIG. 8 is a block diagram of augmented-reality glasses according to a possible implementation of the present disclosure.

The components in the drawings are not necessarily to scale relative to each other. Like reference numerals designate corresponding parts throughout the several views.

DETAILED DESCRIPTION

Augmented-reality (AR) devices, such as AR glasses can aid communication by providing a user with AR data based on audio detected at the device. For example, the AR data may include speech-to-text transcriptions of the audio that is displayed on a heads-up display of the AR glasses. The microphones of the AR glasses may be omnidirectional which may make distinguishing sounds from different directions difficult, thereby leading to inaccurate speech-to-text transcriptions. While beamforming, which includes focusing an overall sensitivity of an array of microphones to a particular direction, can help distinguish sounds from different directions, it can be difficult to determine what direction to focus. The present disclosure describes systems and methods to determine the direction to focus the beamforming based on a direction in which the user's attention is focused. This direction, which may be referred to as the gaze of a user, can be determined by tracking an eye, or eyes, of the user to determine where they are steadily and intently looking. This eye-tracked beamforming (i.e., foveated beamforming) can be used to enhance sounds from a direction that the user is looking (i.e., gaze direction) and to suppress sounds from other directions. The disclosed systems and methods may have the technical effect of improving the performance or usefulness of an AR application. For example, speech-to-text algorithms may be more accurate and relevant when using beamformed audio. Additionally, a speech-to-text transcript may be made more understandable by highlighting speech from the gaze direction.

Figure 1:
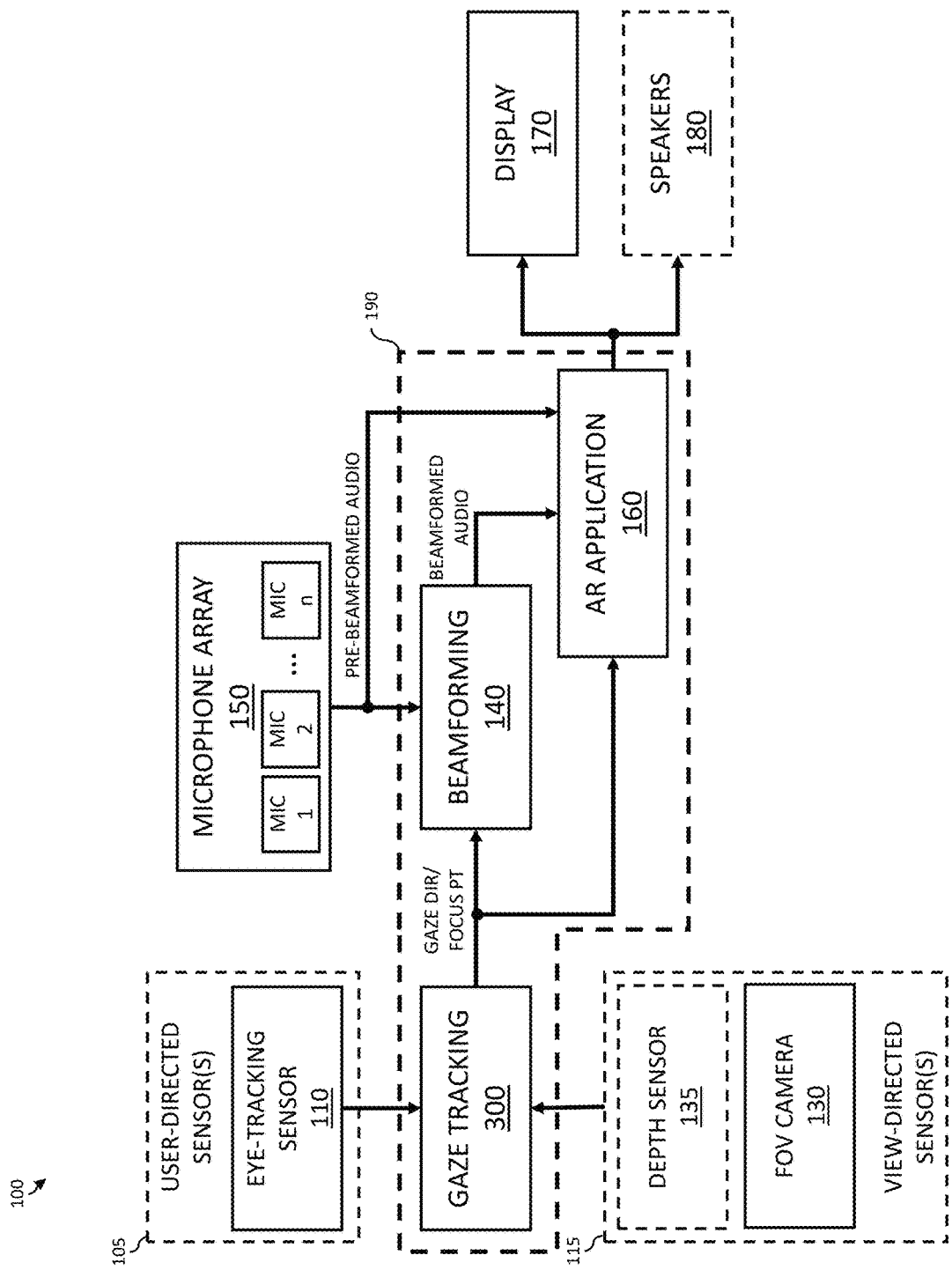
FIG. 1 is a block diagram of an AR device with foveated beamforming according to a possible implementation of the present disclosure.

FIG. 1 is a block diagram of an AR device with foveated beamforming according to a possible implementation. The AR device 100 includes a user-directed sensor 105 (or sensors) configured to detect and/or measure a user wearing the AR device. For example, the user-directed sensor 105 may include an eye-tracking sensor 110 configured to determine positions of the eye (or eyes) of the user. The eye-tracking sensor 110 may be configured to track a left-eye of the user (i.e., a left-eye tracker), track a right-eye of the user (i.e., a right-eye tracker), or both eyes of a user (i.e., a binocular eye tracker). In some implementations, the eye-tracking sensor may include one or more cameras to sense an eye (or each eye), while in other implementations the eye-tracking sensor 110 may include one or more illuminators/photodetectors (e.g., LED/photodiode) to sense an eye (or each eye).

Figure 2:
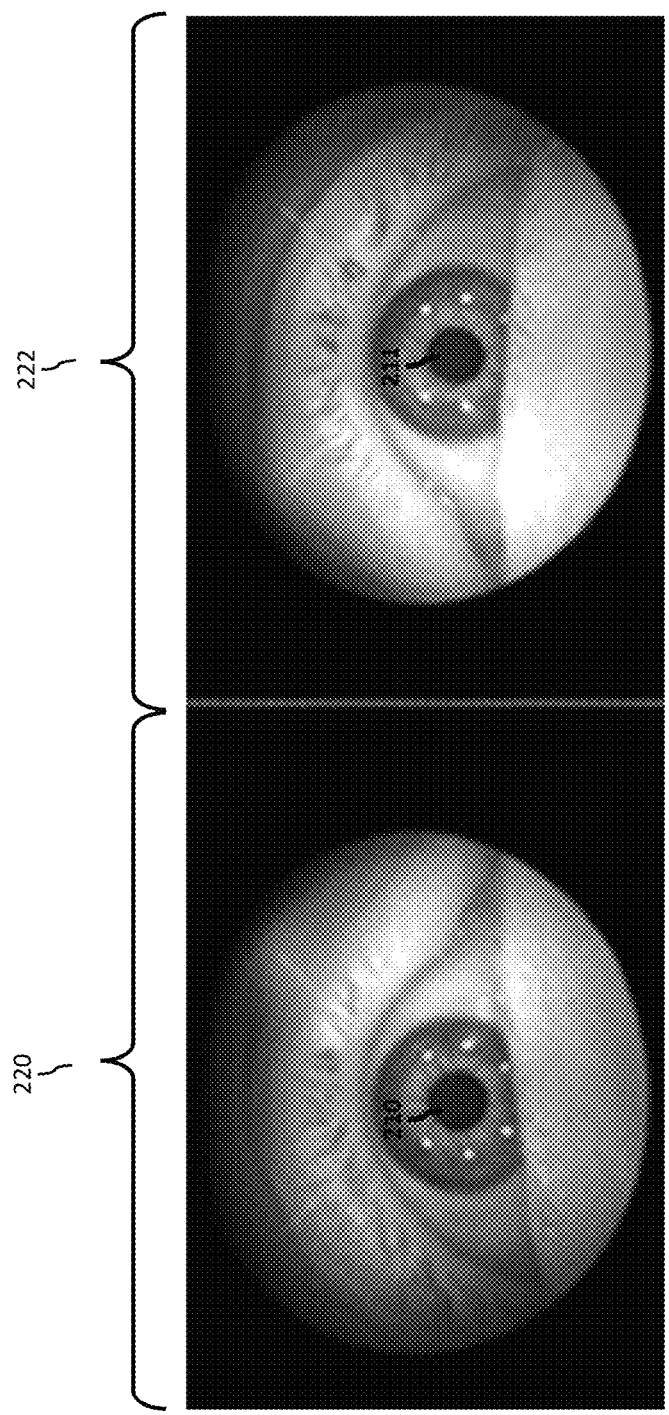
FIG. 2 are eye images from an eye-tracking sensor according to a possible implementation of the present disclosure.

FIG. 2, illustrates images from a possible eye-tracking sensor 110 that includes a left-eye camera and a right-eye camera configured to capture a left eye image 220 and a right eye image 222 of the user. The eye-tracking sensor 110 may output the images of the eyes, but in some implementations, may be further configured to determine eye metrics from the images of the eyes. In these implementations, the eye-tracking sensor 110 may be configured to detect eye landmarks in the images of the eye and to measure the positions (e.g., pixel positions) of these landmarks. For example, the eye landmarks may include a left pupil 210 and a right pupil 211, and the eye-tracking sensor 110 may output eye metrics as a position of a left pupil and a position of a right pupil 211. The position of each eye landmark may correspond to an absolute position within an eye image (e.g., pixel position) or may be a relative position related to other eye landmarks (e.g., relative pixel distance).

While it may be advantageous to integrate a left-eye camera and a right-eye camera with a body of the AR device 100 to gather consistent eye images and help detect and determine the positions of eye landmarks, the eye-tracking sensor 110 may also be implemented as a camera external to, but in communication with, the AR device 100 (i.e., a camera physically separate from the AR device). For example, the eye-tracking sensor 110 may include an external camera (e.g., laptop camera, conference room camera, video conferencing camera) that is directed to a user's face. In these implementations, eye metrics may be gathered by multiple cameras, both internal to the AR device 100 and external to the AR device 100. In these implementations, the positions of the eye landmarks can be used to determine a range at which the user is focused. For example, rays (i.e., gaze vectors) corresponding to each eye can be computationally projected into a field of view of the user to determine where (in the image of the user) they intersect, using a process known as binocular vergence tracking. Using binocular vergence tracking, a range to the object of the user's focus (i.e., focus point) can be computed.

Various collections and combinations of eye-directed cameras can be configured to sense and (in some cases) measure eye metrics with the techniques described herein. Further other eye position sensing techniques, such as electrooculography (EOG) may be used. Accordingly, while an eye-tracking sensor integrated with the AR device that includes eye directed cameras for each eye (see FIG. 2) will be discussed in detail, the present disclosure is not necessarily limited to this implementation.

Returning to FIG. 1, in some implementations, the AR device 100 further includes a view-directed sensor (or sensors) configured to detect and/or measure objects or entities in a field of view of the user. The view-directed sensors 115 may include a field-of-view camera (i.e., FOV camera 130) configured to take images of objects/persons in a field-of-view of the user. The images of the objects/persons in the field-of-view can be analyzed to provide information (i.e., gaze data) useful for tracking a gaze of a user. For example, images may be analyzed to identify a person in a conversation with the user. Additionally, the images may be analyzed to identify and locate a facial landmark on the person, such as a mouth of the person. The location of the facial landmark may be correlated with a coordinate system of the AR device 100 so that it can be calibrated with other gaze data.

Additionally, or alternatively, the view-directed sensors 115 may include a depth sensor 135 configured to measure ranges (i.e., depths) between the AR device 100 and objects/persons in the user's field of view. The depth sensor may be configured to determine the ranges using an optical ranging technology such as lidar, time-of-flight, or structured light. Particular ranges can provide information (i.e., gaze data) useful for tracking a gaze of a user. For example, an average depth in a range of directions including the gaze direction (e.g., within 5 degrees of the gaze direction) can be used as the range to the target for beamforming. In another example, a person may be identified as the target and a range to the identified person can be used for beamforming.

The information from the user-directed sensors (e.g., eye metrics) and the view-directed sensors (e.g., ranges) can form gaze data received at a gaze tracking module 300. The gaze tracking module can be implemented as one or a plurality of software processes 190 (i.e., software programs, software, code, etc.). The software process can be stored on a non-transitory computer readable memory of the AR device. When recalled and executed, the software processes 190 can configure a processor of the AR device (i.e., can be run locally), or alternatively, the software processes can configure a processor of a computing device that is communicatively coupled to the AR device (i.e., can be run remotely). The gaze tracking module 300 can include one or more classifiers configured to determine a gaze direction and/or focus point that corresponds to the gaze data. The classifier may be a machine learning model (e.g., neural network) that is trained prior to use and then updated through use.

A gaze direction is a direction relative to the AR device in which a user is looking steadily. In a possible implementation, the gaze direction can be defined in two dimensions (2D) by an azimuthal angle ($\phi$). In another possible implementation, the gaze direction can be defined in three dimensions by an azimuthal angle ($\phi$) and an elevation angle ($\theta$). The azimuthal angle ($\phi$) and elevation angle ($\theta$) may define a sphere in a three-dimensional (3D) space.

A focus point is a point in the 3D space on which the eyes of the user are focused. The focus point may be determined when a range (i.e., depth) is included with the gaze direction. In other words, the focus point can be defined as an azimuthal angle ($\phi$), an elevation angle ($\theta$), and a range ($r$) in the 3D space. Thus, beamforming may be implemented at optional levels of accuracy based on the inclusion of depth data. For example, when no depth data is included, the beamforming can direct the microphone sensitivity to a particular direction in space. When depth data is included, however, the beamforming can direct the microphone sensitivity to a particular point.

Figure 3:
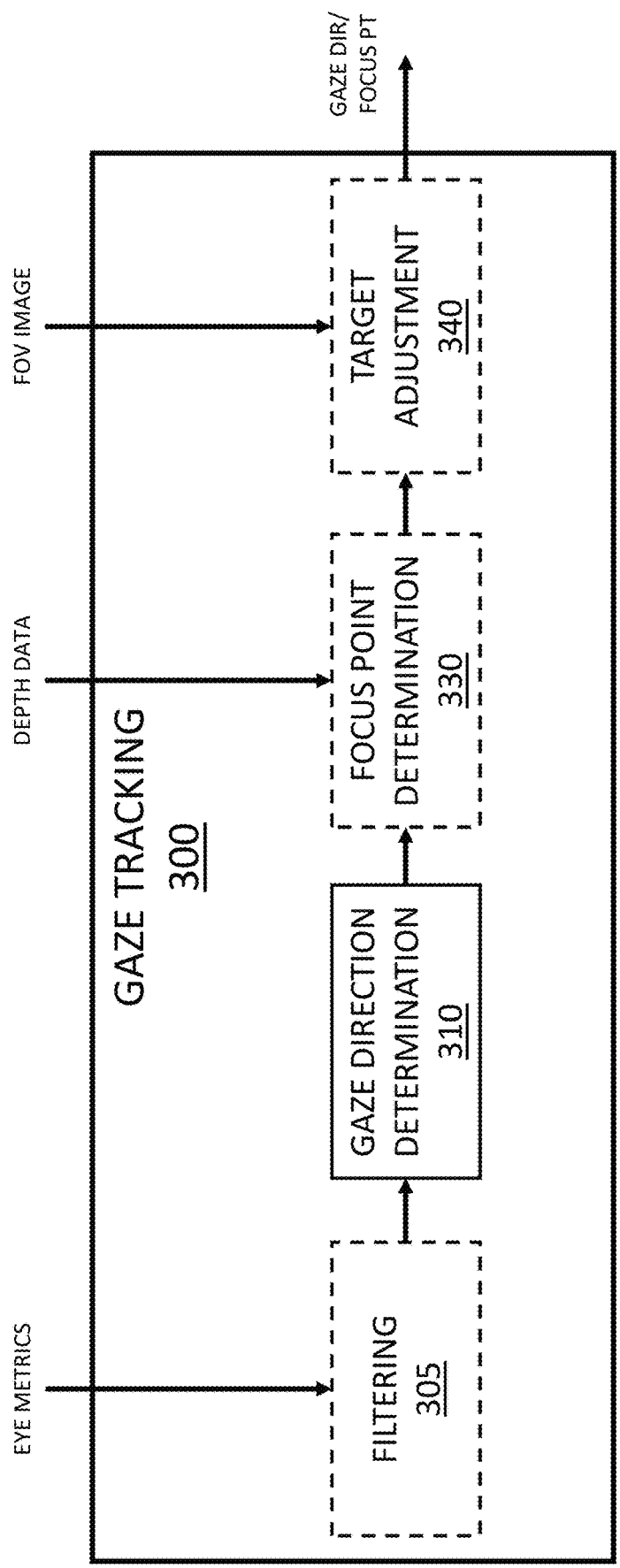
FIG. 3 is a block diagram of a gaze tracking module according to a possible implementation of the present disclosure.

FIG. 3 is a detailed block diagram of a gaze tracking module 300 for the AR device 100. The gaze tracking module 300 includes a gaze direction determination block 310 that, as described previously, can determine a gaze direction from eye metrics, such as the eye images shown in FIG. 2. The eye metrics may rapidly change according to fast movements of the eye. These fast movements, however, may not always correspond to a gaze. Accordingly, to prevent these eye metrics from affecting the determination of the gaze direction, the gaze tracking module may optionally include a filtering block 305 configured to filter eye metrics that change rapidly. The filtering block 305 may include applying a lowpass (LP) filter, such as a Kalman filter or a One-Euro filter, to smooth noisy eye metric data. Smoothing the eye metrics can reduce a time-variation of a computed gaze direction. In other words, applying the low-pass filter to the eye metrics can stabilize the computed gaze direction.

The gaze tracking module 300 may optionally include a focus point determination block 330. The operation of the focus point determination may depend on the presence of a depth sensor. When a depth sensor is included and available, then the depth between the AR device 100 and objects within a range of angles (e.g., 5 degrees) spanning the gaze direction may be captured and averaged to obtain an average depth value. This average depth value (r) may be combined with the gaze direction (φ,θ) to define the focus point for the beamforming. If a depth sensor is not included or not available, then an empirically estimated depth (e.g., 1.8 meters) may be used to define the focus point for the beamforming.

In some cases, the gaze of the user is not exactly aligned with a source of a sound. For example, a user may gaze at a person's eyes while the person speaks. Thus, with no further adjustment, the array of microphones may be focused (i.e., beamformed) on the person's eyes and not on the person's mouth. As a result, an adjustment (i.e., refinement) of the gaze direction or focus point may be necessary when added precision is necessary for beamforming. Accordingly, the gaze tracking module 300 may further include a target adjustment block 340. The target adjustment block 340 may be configured to receive images of the user's field of view and to detect facial landmarks in the images. From the detected facial landmarks, a facial landmark closest to the focus point may be selected as the target for beamforming. Based on this selected target, the gaze direction or the focus point may be adjusted.

In one possible example, the target adjustment block may receive a FOV image from the FOV camera 130 on the AR device 100. The target adjustment block is configured to detect faces in the FOV image. The detected faces may be located in the FOV image and correlated with a direction or a position relative to the gaze direction or the focus point. Next, a mouth on the face closest to the gaze direction or focus point is selected as the target for beamforming. The selection of the mouth may include determining a centroid of the mouth as a point in the image corresponding to the mouth (i.e., mouth point). The gaze direction or focus point may then be adjusted to a direction or a point in space corresponding to the mouth point in the FOV image. For example, a difference between the gaze direction and a direction to the mouth point may be determined and the gaze direction may be adjusted to minimize the difference. In other implementations the target adjustment block may further analyze the FOV images to determine queue for talking and conversation (e.g., lip movement, eye contact, etc.) to identify the face of interest for facial landmark identification.

Returning to FIG. 1, the software processes 190 of the AR device can further include a beamforming module 140. The beamforming module 140 is configured to receive audio from a microphone array 150 of the AR device 100. The microphone array may include a plurality of microphones (MIC1, MIC2, . . . , MICn) that are each configured to convert sounds from the environment to an audio stream (i.e., audio channel). Each microphone can be omnidirectional so that, individually, sounds from all directions are sensed with the same sensitivity. While each microphone may have an omnidirectional sensitivity to the sounds in the environment, the microphone array may have a sensitivity that is directional.

Figure 4:
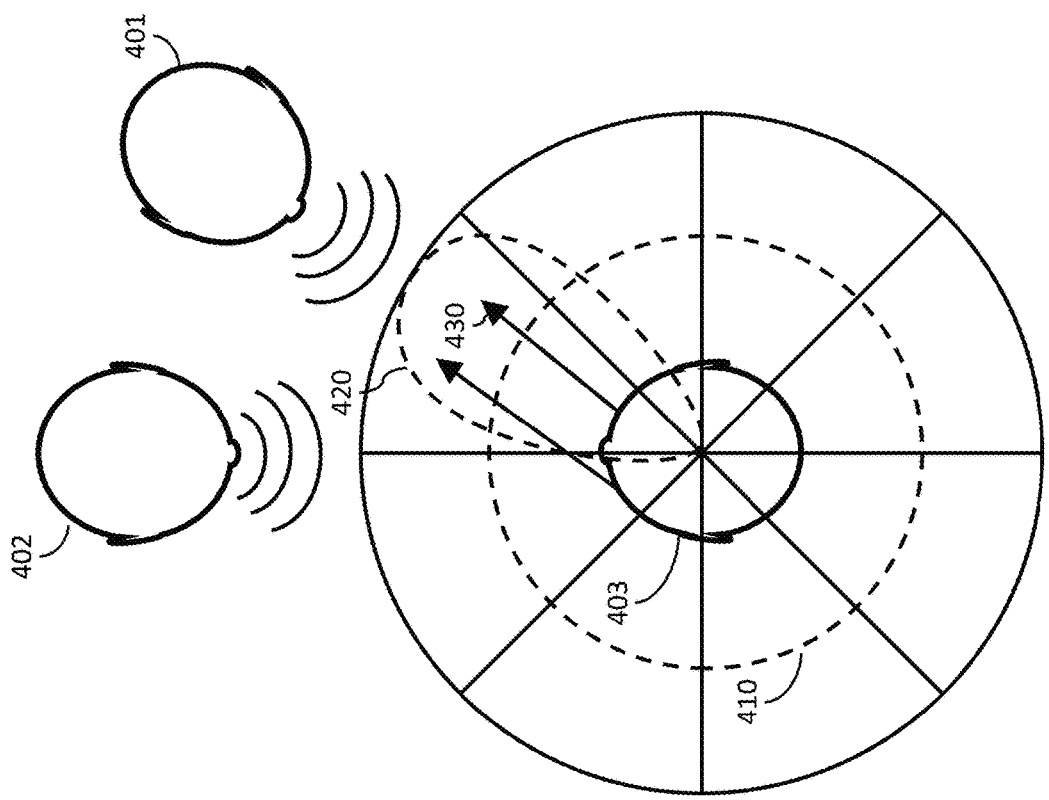
FIG. 4 is a polar plot of microphone sensitivity according to a possible implementation of the present disclosure.

FIG. 4 is a polar plot illustrating sensitivity of a microphone array versus angle. Plotted are patterns illustrating an omnidirectional sensitivity 410 and a directional sensitivity 420. When the sensitivity of the microphone array is omnidirectional, sounds from a first speaker 401 and sounds from a second speaker 402 may be received equally. When the sensitivity of the microphone array is directional and focused on the first speaker 401, sounds from the second speaker 402 may be suppressed while sounds from the first speaker 401 may be enhanced.

A number of microphones in a microphone array and the layout (e.g., spatial separation) of the microphones in the array can provide a directional sensitivity when the audio from the microphones (i.e., audio channels) are combined. Beamforming (i.e., beam steering) adjusts the way the audio channels are combined in order to steer a peak of the sensitivity (i.e., the beam) to a particular direction. As shown in FIG. 4, the beam may be steered to match a gaze direction 430 of a user 403. The user 403 may be facing in a direction that is different from the gaze direction 430. As shown in FIG. 4, the user 403 is facing the second speaker 402 but the gaze direction 430 (and the beam) is directed towards the first speaker 401.

Returning to FIG. 1, the beamforming module 140 is configured to receive the plurality of audio streams (i.e., multiple channels) from the microphone array 150. The multiple channels can be processed (e.g., filtered, delayed, phase shifted, amplified) to generate a beamformed audio signal (i.e., beamformed audio) in which audio from different directions may be enhanced or diminished. While the pre-beamformed audio may include a plurality of audio channels, the beamformed audio may include a single audio channel in which sounds from a gaze direction are enhanced and sounds from other directions are suppressed. Accordingly, the beamforming module 140 is configured to receive a gaze direction or focus point from the gaze tracking module 300 to adjust how the audio channels of the pre-beamformed audio are combined in order to produce the beamformed audio.

As shown in FIG. 1, the software processes 190 of the AR device 100 can further include an application (e.g., an AR application 160). In AR, sensors of the AR device are configured to capture sensory data from an environment and from a user wearing the AR device. Based on this sensory data, the AR application can generate virtual elements to enhance (i.e., augment) the user's perceptual experience. For example, the AR application may be configured to generate a sound (e.g., tone, music, speech, etc.) and/or display a visual (e.g., graphic, text, color, etc.) as virtual elements to add information to the user's perceived environment. Accordingly, the AR application may be communicatively coupled with a display 170 (e.g., heads-up display) or speakers 180 (e.g., earbuds, headphones, speakers) to merge (e.g., overlay) the virtual elements with the real environment. The gaze direction or focus point may configure the AR application to alter an output (i.e., AR data) according to the gaze direction.

In a first possible implementation, the AR application 160 includes transcribing audio from the microphone array into text (i.e., generating a speech-to-text transcript). In this implementation, the AR application 160 is configured to generate a transcript of audio received by the microphone array 150. The transcript may be displayed to the user in real-time. The display 170 may be a heads-up display so that the user can see the transcript overlaid with the user's view of the speakers in the real environment. Because the microphone array 150 can discern sounds from different directions, the transcript can separate speech-to-text by location so that different speakers may be indicated in the transcript. For example, the indication may include a caption (e.g., name or icon) corresponding to the speaker. In another example, indication may include a color or style corresponding to the speaker.

The AR application 160 may receive a gaze direction (or focus point) and adjust a visual feature of the transcript based on the gaze direction. This information may configure the AR application to alter the transcript to indicate the speaker corresponding to the gaze direction (or focus point). Accordingly, the AR application 160 may be configured to determine which speech-to-text is from a speaker in the gaze direction or near (e.g., at) the focus point and which speech-to-text is from speakers in other directions or at other points. Based on this determination, the AR application may change a color, font, or style of speech-to-text from the gaze direction (or near the focus point). In some implementations, the AR application may be configured to filter speech-to-text in the transcript based on the gaze direction (or focus point). For example, speech-to-text not close enough to the gaze direction may be hidden. For example, speech-to-text not in the gaze direction may be hidden from the transcript.

Figure 5:
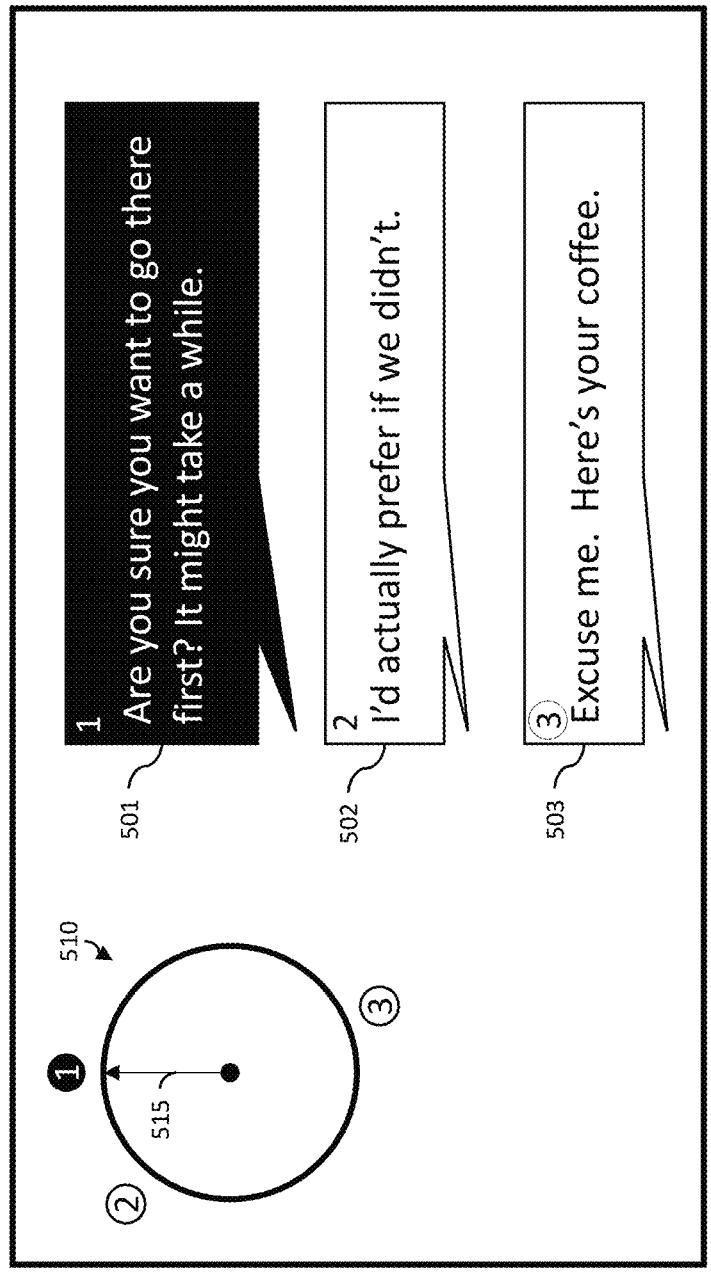
FIG. 5 illustrates an example transcript of an AR application according to a possible implementation of the present disclosure.

FIG. 5 illustrates an example transcript of an AR application 160. In other words, the example transcript shown could be displayed on a display of the AR glasses. The transcript 500 includes a first speech-to-text (i.e., text) (i.e., "are you sure you want to go there first? It might take a while"), a second speech-to-text (i.e., "I'd actually prefer if we didn't"), and a third speech-to-text (i.e., "Excuse me. Here's your coffee"). The transcript 500 further includes a first caption 501 that identifies the first speech-to-text as from the first speaker, a second caption 502 that identifies the second speech-to-text as from the second speaker, and a third caption 503 that identifies the third speech-to-text as from the third speaker. In the example transcript shown, the first caption is altered in color to show that it is from a speaker in the gaze direction.

To determine that the first speaker is in the gaze direction, the AR application may be configured to compare speaker directions determined by interaural delays for audio from the microphones in the microphone array to the gaze direction determined by the gaze tracking module 300. In particular the AR application may compute differences between the gaze direction and each speaker direction and determine a speaker is in the gaze direction based on the comparison. For example, if the difference between the gaze direction and the first speaker direction is below a threshold then the first speaker is determined to be in the gaze direction and the transcript altered accordingly. When a gaze direction changes, the transcript may be updated to highlight a different speaker's speech-to-text.

As shown in FIG. 5, the transcript of the AR application 160 further includes a map 510. The map 510 shown is a top down overview of a user at the center with speakers spatially arranged around the user according to speaker direction. A gaze direction 515 of the user is indicated in the map 510.

The map can be implemented in various ways. For example, while a 2D map is shown the map could be a 3D visualization in which a virtual spotlight aligned with the gaze direction (i.e., the beamforming) is illustrated.

In another possible implementation, the AR application 160 includes beamforming based on a gaze direction for playback of audio. In a possible use, a conductor of a symphony orchestra wishes to listen to the audio from the trumpet team at a particular position. During playback of a recording of the symphony the conductor gazes in a direction corresponding to the trumpet team to generate beamformed audio that includes enhanced audio from the trumpet team and suppressed audio from other teams. The beamformed audio can be played back on speakers of the AR device or communicatively coupled to the AR device (e.g., via wireless communication).

In another possible implementation, the AR application 160 includes beamforming based on a gaze direction for recording or broadcasting of audio. In a possible use, a lecturer in a lecture hall wishes to record or broadcast audio from an audience member (e.g., during a question/answer session). During recording or broadcasting the lecturer gazes in a direction corresponding to the audience member to generate beamformed audio that includes enhanced audio from the audience member. The beamformed audio can be recorded to a memory or broadcast over a speaker communicatively coupled to the AR device (e.g., via wireless communication).

In another possible implementation, the AR application 160 includes beamforming based on a gaze direction for assisting a user's hearing of audio. In a possible use, a user is buying a train ticket in a noisy train station and wishes to hear audio from the ticket merchant. The user listens to beamformed audio in real-time through speakers of the AR device or through speakers (e.g., earbuds) communicatively coupled to the AR device. By gazing at the ticket merchant, the beamformed audio enhances audio from the ticket merchant and suppresses other audio from the noisy train station so that the user can hear the ticket merchant better and/or is not be distracted by other sounds.

Figure 6:
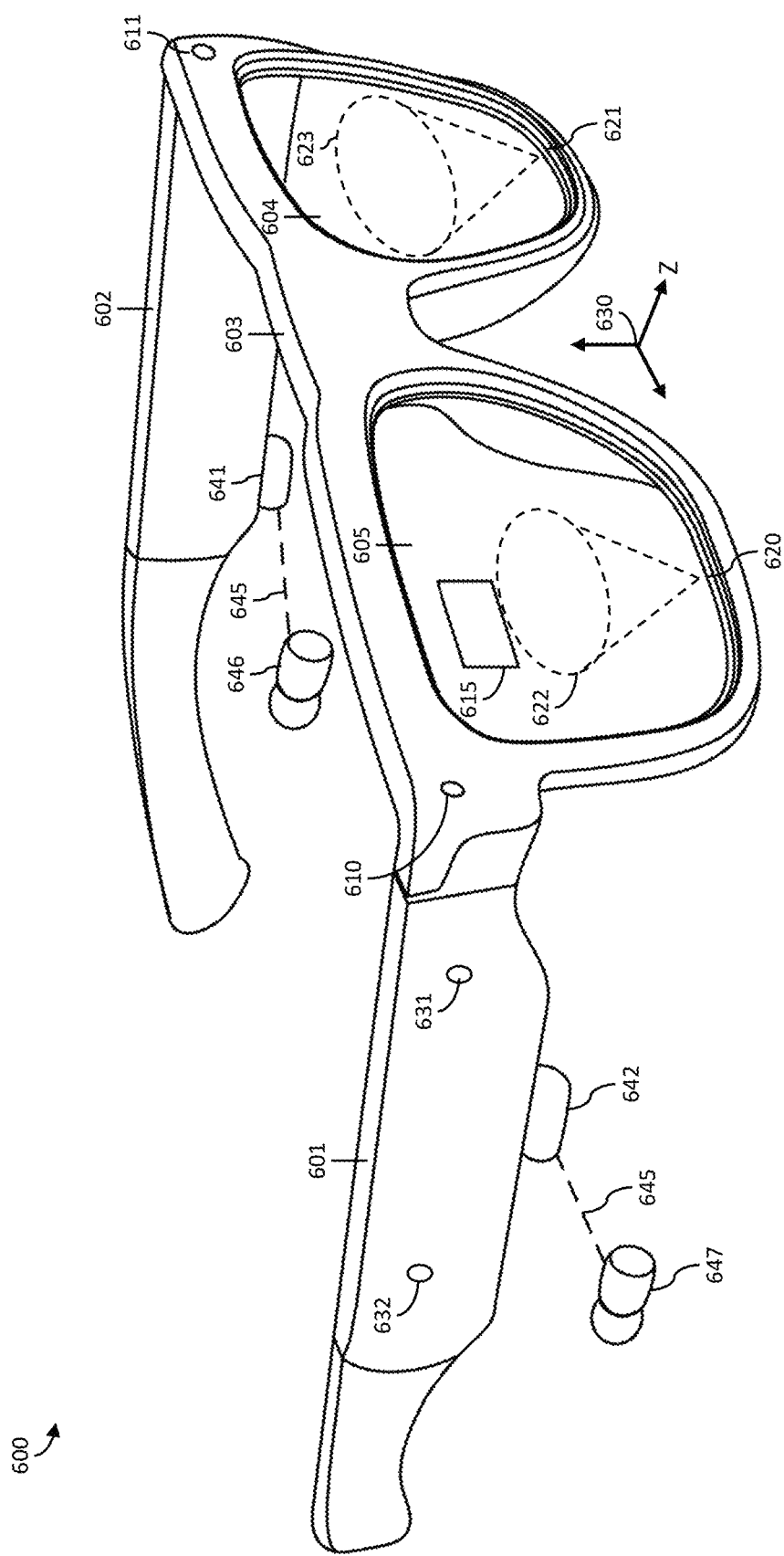
FIG. 6 is a perspective view of AR glasses according to a possible implementation of the present disclosure.

The AR device 100 can be AR glasses. FIG. 6 is a perspective view of AR glasses according to a possible implementation of the present disclosure. The AR glasses 600 are configured to be worn on a head and a face of a user. The AR glasses 600 include a right earpiece 601 and a left earpiece 602 that are supported by the ears of a user. The AR glasses further include a bridge portion 603 that is supported by the nose of the user so that a left lens 604 and a right lens 605 can be positioned in front a left eye of the user and a right eye of the user respectively. The portions of the AR glasses can be collectively referred to as the frame of the AR glasses. The frame of the AR glasses can contain electronics to enable function. For example, the frame may include a battery, a processor, a memory (e.g., non-transitory computer readable medium), and electronics to support sensors (e.g., cameras, depth sensors, etc.), and interface devices (e.g., speakers, display, network adapter, etc.).

The AR glasses 600 can include a FOV camera 610 (e.g., RGB camera) that is directed to a camera field-of-view that overlaps with the natural field-of-view of the user's eyes when the glasses are worn. In a possible implementation, the AR glasses can further include a depth sensor 611 (e.g., LIDAR, structured light, time-of-flight, depth camera) that is directed to a depth-sensor field-of-view that overlaps with the natural field-of-view of the user's eyes when the glasses are worn. Data from the depth sensor 611 and/or the FOV camera 610 can be used to measure depths in a field-of-view (i.e., region of interest) of the user (i.e., wearer). In a possible implementation, the camera field-of-view and the depth-sensor field-of-view may be calibrated so that depths (i.e., ranges) of objects in images from the FOV camera 610 can be determined, where the depths are measured between the objects and the AR glasses.

The AR glasses 600 can further include a display 615. The display may present AR data (e.g., images, graphics, text, icons, etc.) on a portion of a lens (or lenses) of the AR glasses so that a user may view the AR data as the user looks through a lens of the AR glasses. In this way, the AR data can overlap with the user's view of the environment.

The AR glasses 600 can further include an eye-tracking sensor. The eye tracking sensor can include a right-eye camera 620 and a left-eye camera 621. The right-eye camera 620 and the left-eye camera 621 can be located in lens portions of the frame so that a right FOV 622 of the right-eye camera includes the right eye of the user and a left FOV 623 of the left-eye camera includes the left eye of the user when the AR glasses are worn.

The AR glasses 600 can further include a plurality of microphones (i.e., 2 or more microphones). The plurality of microphones can be spaced apart on the frames of the AR glasses. As shown in FIG. 6, the plurality of microphones can include a first microphone 631 and a second microphone 632. The plurality of microphones may be configured to operate together as a microphone array that has a beam of sensitivity directed in a particular direction.

Figure 7:
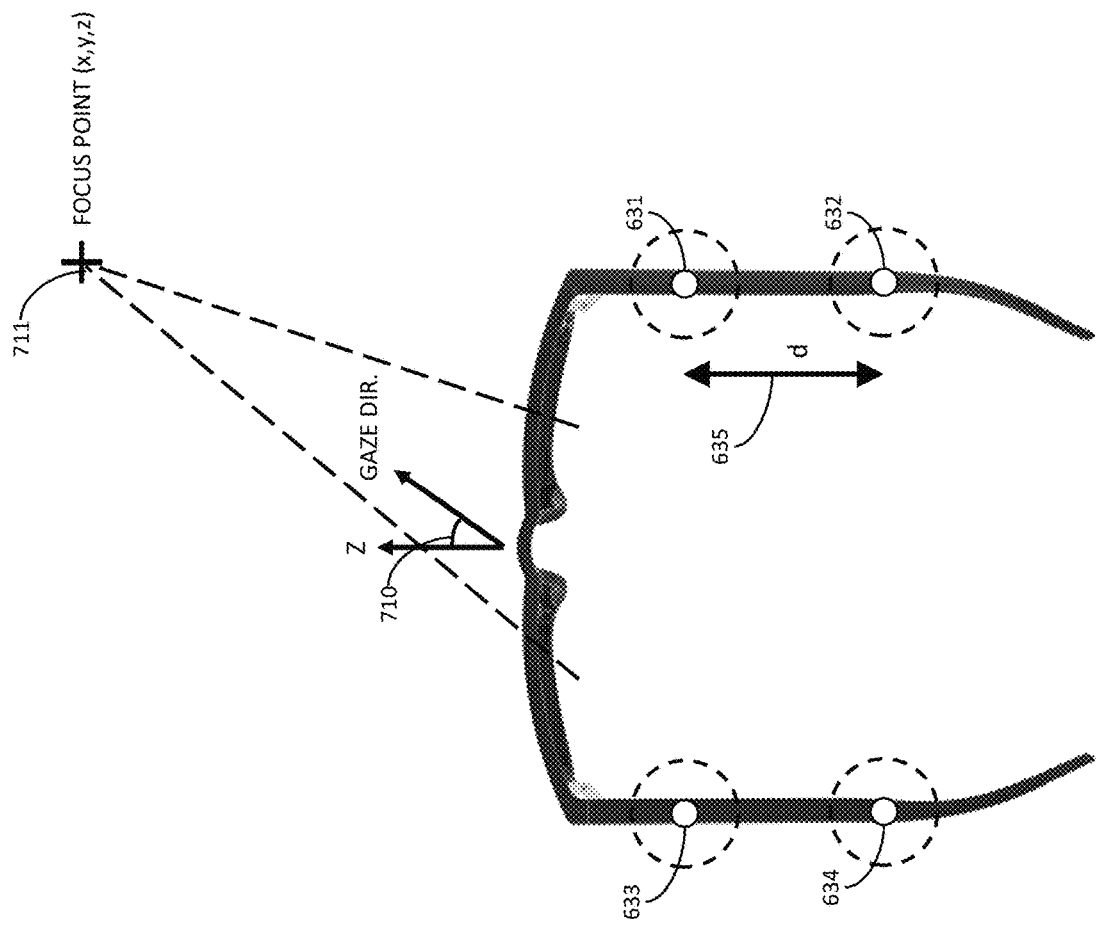
FIG. 7 is a top-view of augmented reality glasses with an array of microphones according to a possible implementation of the present disclosure.

FIG. 7 is a top-view of the AR glasses 600. In this example implementation, the microphone array includes the first microphone 631, the second microphone 632, a third microphone 633 and a fourth microphone 634. The microphones may be arranged in a variety of possible microphone array layouts (i.e., configurations). As shown, one possible array of microphones (i.e., microphone array) includes a left pair of microphones 633, 634 and a right pair of microphones 631, 632. A sensitivity pattern of the array of microphones may correspond to the spacing between the microphones, where larger spacings provide more directive beams. Accordingly, the right pair of microphones can be separated by a distance 635 that is greater than or equal to one centimeter (i.e., d≥1 cm). The right pair of microphones may be symmetrically arranged to the left pair of microphones.

The images (i.e., FOV, eye tracking) and the depth data collected by the AR glasses can be calibrated with (i.e., registered to) a coordinate system 630 (i.e., frame of reference), as shown in FIG. 6. The sensitivity (i.e., beam) of the microphone array can also be registered to the coordinate system 630 so that a gaze direction or a focus point may reference this coordinate system. As shown in FIG. 7, a gaze direction may be an angle 710 relative to the coordinate system 630 of the AR glasses, and the focus point 711 may be a point relative to the coordinate system 630 of the AR glasses.

As shown in FIG. 6, the AR glasses may further include a left speaker 641 and a right speaker 642 configured to transmit audio (e.g., beamformed audio) to the user. Additionally, or alternatively, transmitting audio to a user may include transmitting the audio over a wireless communication link 645 to a listening device (e.g., hearing aid, earbud, etc.). For example, the AR glasses may transmit audio (e.g., beamformed audio) to a left wireless earbud 646 and to a right earbud 647.

FIG. 8 is a flowchart of a method for gaze-directed beamforming on AR glasses. The method 800 includes computing 810 a gaze direction based on eye metrics (e.g., eye images, pupil locations) received from an eye-tracking sensor (e.g., right-eye camera, left-eye camera) of the AR glasses. The method further includes recognizing 820 a target (e.g., person) in the gaze direction based on images received from a field-of-view camera of the AR glasses. The method further includes determining 830 a range to the target (i.e., between the AR glasses and the target) based on depth data received from a depth sensor (e.g., LIDAR, time-of-flight sensor, structured light sensor, stereoscopic camera, etc.) of the AR glasses. The method further includes computing 840 a focus point based on the gaze direction and the range and adjusting 850 a sensitivity of a microphone array of the AR glasses to the focus point using beamforming.

In the specification and/or figures, typical embodiments have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

It will be understood that, in the foregoing description, when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

What is claimed is:

1. Augmented reality glasses, comprising:
   a microphone array configured to capture a plurality of audio signals, the plurality of audio signals including sounds from around a user;
   an eye-tracking sensor configured to sense eye metrics of the user; and
   a processor configured by software to:
   apply a filter to the eye metrics from the eye-tracking sensor;
   compute a focus point based on the filtered eye metrics and gaze data from other sensors of the augmented reality glasses;
   combine the plurality of audio signals according to the focus point to generate a beamformed audio signal in which the sounds around the user are enhanced and suppressed according to their position relative to the focus point; and
   adjust an output of an application based on the beamformed audio signal and a gaze direction towards the focus point.

2. The augmented reality glasses according to claim 1 wherein the microphone array includes a left pair of microphones on a left earpiece of the augmented reality glasses and a right pair of microphones on a right earpiece of the augmented reality glasses.

3. The augmented reality glasses according to claim 1, wherein:
   the eye-tracking sensor includes a right-eye camera configured to capture a right-eye image of a right eye of the user and a left-eye camera configured to capture a left-eye image of a left eye of the user; and
   the eye metrics include pupil positions in the right-eye image and the left-eye image.

4. The augmented reality glasses according to claim 1, wherein the other sensors of the augmented reality glasses include:
   a depth sensor configured to measure depths in a field-of-view of the augmented reality glasses.

5. The augmented reality glasses according to claim 4, wherein the gaze data includes:
   an average depth in a range of directions including the gaze direction.

6. The augmented reality glasses according to claim 1, wherein the other sensors of the augmented reality glasses include:
   a field-of-view camera configured to capture a field-of-view image of a field-of-view of the augmented reality glasses.

7. The augmented reality glasses according to claim 6, wherein the gaze data includes:
   a position of a facial landmark in the field of view image.

8. The augmented reality glasses according to claim 1, wherein:
   the output of the application includes a speech-to-text transcript, the speech-to-text transcript adjusted so that portions from the gaze direction are displayed differently from portions not from the gaze direction.

9. The augmented reality glasses according to claim 1, wherein:
   the output of the application includes beamformed audio played on speakers, the beamformed audio having sounds from the focus point enhanced and sounds not from the focus point suppressed.

10. The augmented reality glasses according to claim 1, wherein the filter is a Kalman filter or a One-Euro filter.

11. A method for gaze-directed beamforming on augmented reality (AR) glasses, the method comprising:
    computing a gaze direction based on eye metrics received from an eye-tracking sensor of the AR glasses;
    recognizing a target in the gaze direction based on images received from a field-of-view camera of the AR glasses;
    determining a range to the target based on depth data received from a depth sensor of the AR glasses;
    computing a focus point based on the gaze direction and the range; and
    adjusting a sensitivity of a microphone array of the AR glasses to the focus point using beamforming.

12. The method according to claim 11, wherein determining the range to the target based on depth data from the depth sensor of the AR glasses includes:
    determine an average depth in range of directions including the gaze direction as the range to the target.

13. The method according to claim 11, further comprising:
    refining the focus point based on a facial landmark detected in the images received from the field-of-view camera.

14. The method according to claim 11, further comprising:
    transcribing audio from the microphone array into text; and
    displaying the text on a display of the AR glasses so that text of speech from the focus point is displayed differently than text from positions other than the focus point.

15. The method according to claim 11, wherein computing the gaze direction based on eye metrics received from the eye-tracking sensor of the AR glasses includes:
    applying a low-pass filter to the eye metrics to stabilize the computed gaze direction.

16. The method according to claim 11, wherein the eye-tracking sensor is a camera or cameras communicatively coupled to and physically separate from the AR glasses.

17. A method for transcribing speech-to-text, the method comprising:
    receiving eye metrics of a user wearing augmented-reality (AR) glasses from an eye-tracking sensor;
    computing a gaze direction based on the eye metrics;
    adjusting a sensitivity of a microphone array of the AR glasses to the gaze direction using beamforming;
    generating a transcript based on speech received by the microphone array;

adjusting a visual feature of the transcript based on the gaze direction; and displaying the transcript on a display of the AR glasses.

18. The method according to claim 17, wherein the adjusting the visual feature of the transcript based on the gaze direction includes:

displaying portions of the transcript from the gaze direction; and hiding portions of the transcript not from the gaze direction.

19. The method according to claim 17, wherein the visual feature of the transcript is a color, a font, or a style of speech-to-text from the gaze direction.

20. The method according to claim 17, wherein the visual feature of the transcript is a map illustrating the gaze direction relative to directions of speech received by the microphone array.

* * * * *